(12) United States Patent
Letey et al.

(10) Patent No.: US 10,353,815 B2
(45) Date of Patent: Jul. 16, 2019

(54) DATA SECURITY FOR MULTIPLE BANKS OF MEMORY

(71) Applicant: Microsoft Technology Licensing, LLC, Redmond, WA (US)

(72) Inventors: George Thomas Letey, Louisville, CO (US); Douglas L. Stiles, Livermore, CA (US); Edmund B. Nightingale, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/607,279

(22) Filed: May 26, 2017

(65) Prior Publication Data

US 2018/0341584 A1    Nov. 29, 2018

(51) Int. Cl.
| | | |
|---|---|---|
| *G06F 12/06* | (2006.01) | |
| *G06F 9/30* | (2018.01) | |
| *H04L 29/08* | (2006.01) | |
| *H04L 9/32* | (2006.01) | |
| *G11C 11/408* | (2006.01) | |

(Continued)

(52) U.S. Cl.
CPC ........ *G06F 12/0661* (2013.01); *G06F 9/3012* (2013.01); *G06F 9/4411* (2013.01); *G06F 12/06* (2013.01); *G06F 12/0669* (2013.01); *G06F 21/575* (2013.01); *G06F 21/74* (2013.01); *G06F 21/79* (2013.01); *G11C 8/12* (2013.01); *G11C 11/4087* (2013.01); *H04L 9/3247* (2013.01); *H04L 67/125* (2013.01)

(58) Field of Classification Search
USPC ..................................................... 710/7–14
See application file for complete search history.

(56) References Cited

U.S. PATENT DOCUMENTS

| | | |
|---|---|---|
| 5,630,099 A | 5/1997 | MacDonald et al. |
| 5,706,407 A | 1/1998 | Nakamura et al. |

(Continued)

FOREIGN PATENT DOCUMENTS

| | | |
|---|---|---|
| EP | 1736877 A2 | 12/2006 |
| EP | 2808818 A1 | 12/2014 |
| WO | 2015103374 A1 | 7/2015 |

OTHER PUBLICATIONS

Letey, George Thomas; "Core Mapping"; U.S. Appl. No. 15/607,330, filed May 26, 2017; 32 pages.

(Continued)

*Primary Examiner* — Raymond N Phan
(74) *Attorney, Agent, or Firm* — Davin Chin; Chin IP, PLLC

(57) ABSTRACT

The disclosed technology is generally directed to data security. In one example of the technology, data is stored in a memory. The memory includes a plurality of memory banks including a first memory bank and a second memory bank. At least a portion of the data is interleaved amongst at least two of the plurality of memory banks. Access is caused to be prevented to at least one of the plurality of memory banks while a debug mode or recovery mode is occurring. Also, access is caused to be prevented to the at least one of the plurality of memory banks starting with initial boot until a verification by a security complex is successful. The verification by the security complex includes the security complex verifying a signature.

20 Claims, 6 Drawing Sheets

(51) Int. Cl.
  *G11C 8/12*     (2006.01)
  *G06F 9/4401*   (2018.01)
  *G06F 21/57*    (2013.01)
  *G06F 21/74*    (2013.01)
  *G06F 21/79*    (2013.01)

(56) References Cited

U.S. PATENT DOCUMENTS

| | | | |
|---|---|---|---|
| 5,926,648 | A | 7/1999 | Ayzenberg |
| 6,775,730 | B2 | 8/2004 | Marr et al. |
| 7,315,940 | B1 | 1/2008 | Audette et al. |
| 7,398,390 | B2 | 7/2008 | Hyser |
| 7,467,254 | B2 | 12/2008 | Dortu |
| 7,836,263 | B2 | 11/2010 | Fukushige et al. |
| 8,001,334 | B2 | 8/2011 | Lee |
| 8,051,263 | B2 | 11/2011 | Renno |
| 8,135,884 | B1 | 3/2012 | Sullam et al. |
| 8,180,973 | B1 | 5/2012 | Armangau et al. |
| 8,528,102 | B2 | 9/2013 | Chen et al. |
| RE45,097 | E | 8/2014 | Iyer et al. |
| 8,875,276 | B2 | 10/2014 | Cullimore et al. |
| 9,189,439 | B2 | 11/2015 | Rachakonda et al. |
| 9,275,709 | B2 | 3/2016 | Yasuda |
| 9,323,932 | B2 | 4/2016 | Kegel |
| 9,336,168 | B2 | 5/2016 | Liu et al. |
| 9,354,934 | B2 | 5/2016 | Accapadi et al. |
| 9,384,165 | B1 | 7/2016 | Bao et al. |
| 9,405,691 | B2 | 8/2016 | Vajapeyam |
| 9,465,617 | B1 | 10/2016 | Warkentin et al. |
| 9,525,626 | B2 | 12/2016 | Khoo et al. |
| 2002/0032829 | A1 | 3/2002 | Dalrymple |
| 2003/0115394 | A1 | 6/2003 | Kulchytskyy et al. |
| 2008/0092145 | A1 | 4/2008 | Sun et al. |
| 2009/0007121 | A1 | 1/2009 | Yamada et al. |
| 2009/0157936 | A1 | 6/2009 | Goss et al. |
| 2009/0204823 | A1 | 8/2009 | Giordano et al. |
| 2009/0257594 | A1* | 10/2009 | Qureshi ........... G01R 31/31705 380/277 |
| 2010/0095089 | A1 | 4/2010 | Kwon |
| 2012/0060039 | A1 | 3/2012 | Leclercq |
| 2014/0089725 | A1 | 3/2014 | Ackaret et al. |
| 2014/0108691 | A1 | 4/2014 | Kennedy et al. |
| 2014/0173265 | A1 | 6/2014 | Kegel |
| 2014/0181351 | A1 | 6/2014 | Fatemi et al. |
| 2014/0298056 | A1 | 10/2014 | Seki et al. |
| 2015/0052409 | A1 | 2/2015 | Jones |
| 2015/0356039 | A1 | 12/2015 | Kris |
| 2016/0232057 | A1* | 8/2016 | Star ................ G06F 11/1417 |
| 2016/0299720 | A1 | 10/2016 | Berntsen et al. |
| 2016/0328272 | A1 | 11/2016 | Ahmed et al. |
| 2017/0046228 | A1* | 2/2017 | Palayur .............. G06F 11/3664 |
| 2018/0341620 | A1 | 11/2018 | Letey et al. |
| 2018/0343234 | A1 | 11/2018 | Letey et al. |

OTHER PUBLICATIONS

Letey, George Thomas; "Subsystem Firewalls"; U.S. Appl. No. 15/607,311, filed May 26, 2017; 38 pages.

Non-Final Office Action dated Mar. 28, 2018 in U.S. Appl. No. 15/607,330, 5 pages.

"International Search Report and Written Opinion Issued in PCT Application No. PCT/US18/029670", dated Jul. 5, 2018, 13 Pages.

"International Search Report and Written Opinion Issued in PCT Application No. PCT/US18/029675", dated Jul. 26, 2018, 11 Pages.

"International Search Report and Written Opinion Issued in PCT Application No. PCT/US18/029679", dated Jul. 24, 2018, 15 Pages.

"Non Final Office Action Issued in U.S. Appl. No. 15/607,330", dated Oct. 30, 2018, 14 Pages.

"Non Final Office Action Issued in U.S. Appl. No. 15/607,311", dated Feb. 26, 2019, 11 Pages.

"Final Office Action Issued in U.S. Appl. No. 15/607,311", dated Apr. 29, 2019, 12 Pages.

* cited by examiner

DATA SECURITY FOR MULTIPLE BANKS OF MEMORY

BACKGROUND

The Internet of Things ("IoT") generally refers to a system of devices capable of communicating over a network. The devices can include everyday objects such as toasters, coffee machines, thermostat systems, washers, dryers, lamps, automobiles, and the like. The network communications can be used for device automation, data capture, providing alerts, personalization of settings, and numerous other applications.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to data security. In one example of the technology, data is stored in a memory. The memory includes a plurality of memory banks including a first memory bank and a second memory bank. At least a portion of the data is interleaved amongst at least two of the plurality of memory banks. Access is caused to be prevented to at least one of the plurality of memory banks while a debug mode or recovery mode is occurring. Also, access is caused to be prevented to the at least one of the plurality of memory banks starting with initial boot until a verification by a security complex is successful. The verification by the security complex includes the security complex verifying a signature.

In some examples of the disclosure, a device includes an internal or external flash memory that includes two or more flash memory banks. The data stored in the flash memory may include a secure portion including secure information interleaved among the flash memory banks. The device may provide a recovery mode which allows the flash memory to be re-flashed while not allowing all of the flash memory banks to be accessed.

In some examples, during debug mode or recovery mode, access to all of the flash memory banks is prevented, and this prevention is hardware enforced. This may prevent a rollback attack from being able to access the secure portion of the flash memory. In some examples, upon initial boot, access to all of the flash memory banks is prevented. For instance, in some examples, upon initial boot, access to one of the flash memory banks is allowed, and access to another of the flash memory banks is prevented. In some examples, this prevention is maintained throughout all of a debug mode or recovery mode. In some examples, during recovery mode, prevention from accessing at least one of the flash memory banks is hardware-enforced.

In some examples, during a "standard" boot, a secure boot process is used in which the ROM initiates a first bootloader and it is verified that the first bootloader is properly signed. In some examples, until it is verified that the first bootloader is properly signed, the first bootloader is not loaded, and access to the flash access to all of the flash memory banks is prevented. During a normal boot that is not a boot into a debug mode, recovery mode, or the like, access may be allowed to all of the flash memory banks after the digital signature of the first bootloader is verified.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
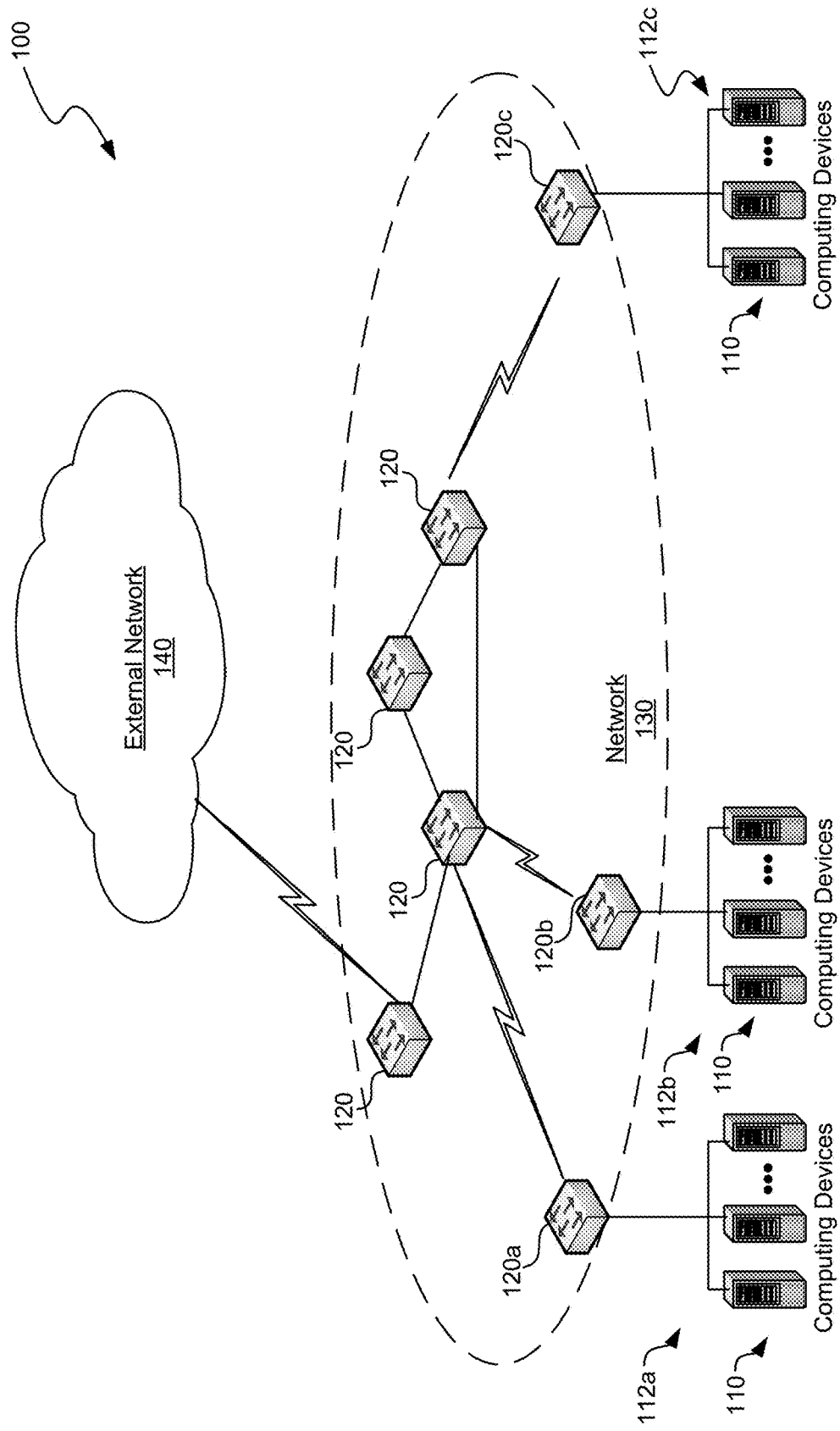
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to data security. In one example of the technology, data is stored in a memory. The memory includes a plurality of memory banks including a first memory bank and a second memory bank. At least a portion of the data is interleaved amongst at least two of the plurality of memory banks. Access is caused to be prevented to at least one of the plurality of memory banks while a debug mode or recovery mode is occurring. Also, access is caused to be prevented to the at least one of the plurality of memory banks starting with initial boot until a verification by a security complex is successful. The verification by the security complex includes the security complex verifying a signature.

In some examples of the disclosure, a device includes an internal or external flash memory that includes two or more flash memory banks. The data stored in the flash memory may include a secure portion including secure information interleaved among the flash memory banks. The device may provide a recovery mode which allows the flash memory to be re-flashed while not allowing all of the flash memory banks to be accessed.

In some examples, during debug mode or recovery mode, access to all of the flash memory banks is prevented, and this prevention is hardware enforced. This may prevent a rollback attack from being able to access the secure portion of the flash memory. In some examples, upon initial boot, access to all of the flash memory banks is prevented. For instance, in some examples, upon initial boot, access to one of the flash memory banks is allowed, and access to another of the flash memory banks is prevented. In some examples, this prevention is maintained throughout all of a debug mode or recovery mode. In some examples, during recovery mode, prevention from accessing at least one of the flash memory banks is hardware-enforced.

In some examples, during a "standard" boot, a secure boot process is used in which the ROM initiates a first bootloader and it is verified that the first bootloader is properly signed. In some examples, until it is verified that the first bootloader is properly signed, the first bootloader is not loaded, and access to the flash access to all of the flash memory banks is prevented. During a normal boot that is not a boot into a debug mode, recovery mode, or the like, access may be allowed to all of the flash memory banks after the digital signature of the first bootloader is verified.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 12a-12c. In the illustrated example, each of host sets 12a-12c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

In some examples, one or more of the computing devices 110 is an IoT device, a device that comprises part or all of an IoT support service, a device comprising part or all of an application back-end, or the like, as discussed in greater detail below.

Illustrative Computing Device

Figure 2:
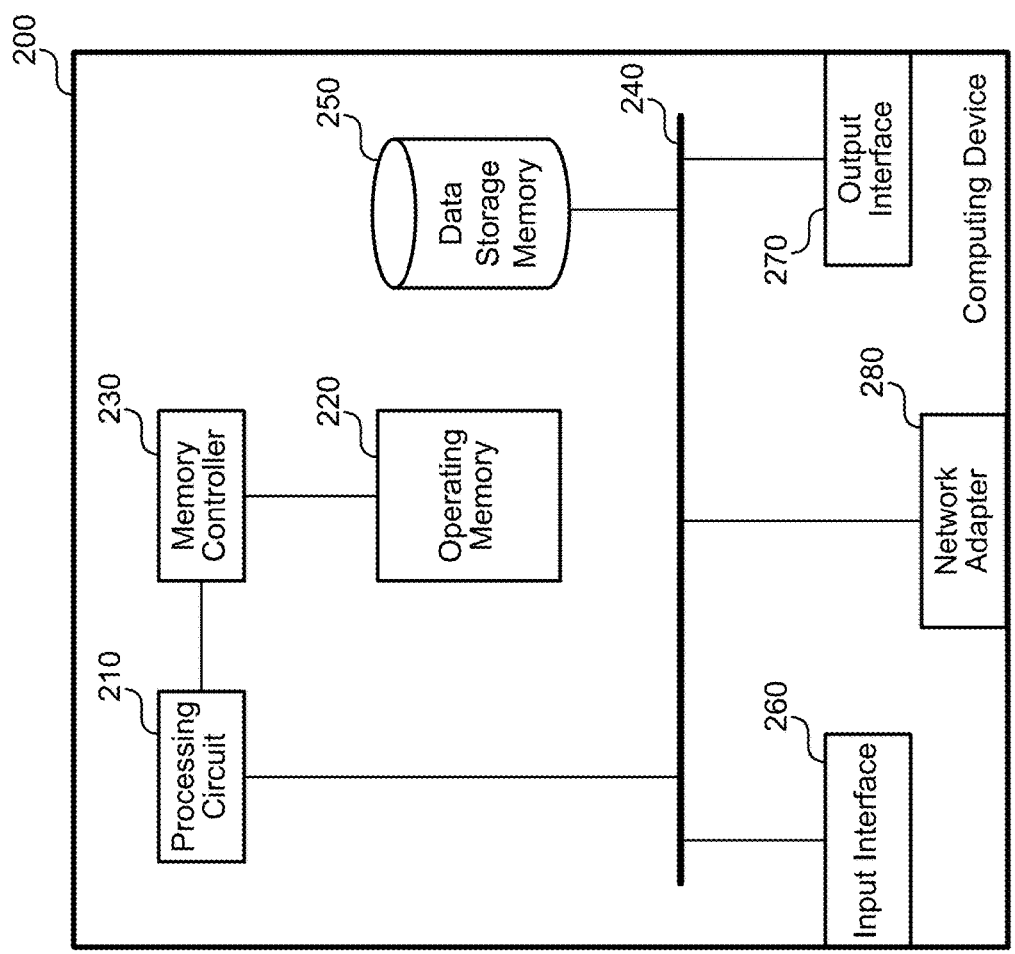
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device 110 or network node 120 of FIG. 1. Computing device 200 may also be an IoT device that connects to a network to receive IoT services. Likewise, computer device 200 may be an example any of the devices illustrated in or referred to in FIGS. 3-5, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. Processing circuit 210 is an example of a core. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process. In some examples, other forms of execution may be employed, such as execution directly from data storage component 250, e.g., eXecute In Place (XIP).

Operating memory 220 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudorandom random access memory (PSRAM), or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage. In some examples, performance counter 475 may also be configured to measure latency from a core to a target, such as from MCU 462 to SRAM 458.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter ("UART"), a Serial Peripheral Interface ("SPI"), Inter-Integrated Circuit ("I2C"), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, SigFox, LoRa, Powerline, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions.

Illustrative Systems

Some examples of the disclosure are used in the context of a multi-core microcontroller included in an IoT device that operates as a device controller for an IoT device. Examples of the disclosure may also be used in other suitable contexts. A particular example of the disclosure used in the context of a multi-core microcontroller included in an IoT device that operates as a device controller for an IoT device is discussed below with regard to FIG. 4 and FIG. 5.

Figure 3:
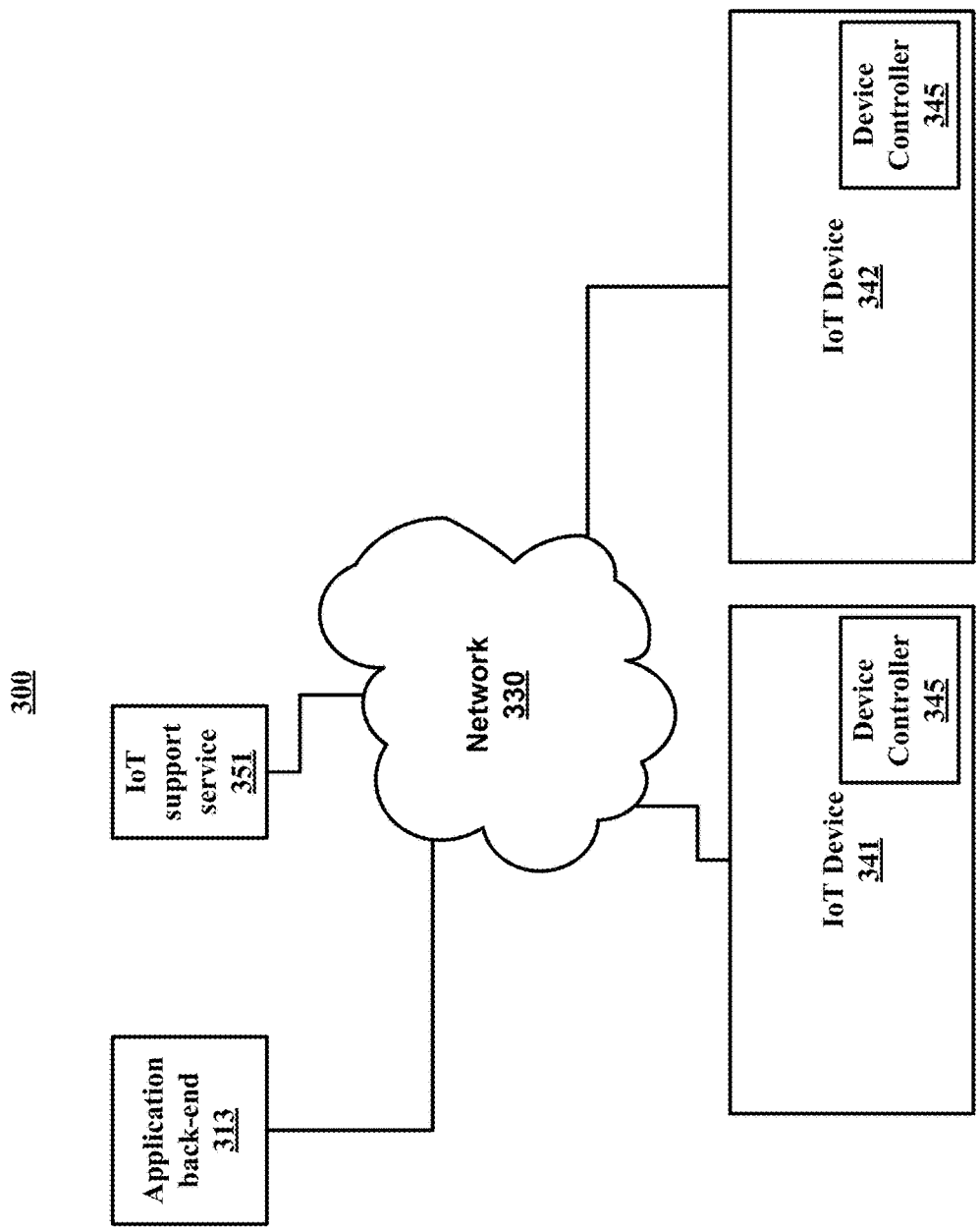
FIG. 3 is a block diagram illustrating an example of a system for data security.

FIG. 3 is a block diagram illustrating an example of a system (300). System 300 may include network 330, as well as IoT support service 351, IoT devices 341 and 342, and application back-end 313, which all connect to network 330.

The term "IoT device" refers to a device intended to make use of IoT services. An IoT device can include virtually any device that connects to a network to use IoT services, including for telemetry collection or any other purpose. IoT devices include any devices that can connect to a network to make use of IoT services. In various examples, IoT devices may communicate with a cloud, with peers or local system or a combination or peers and local systems and the cloud, or in any other suitable manner. IoT devices can include everyday objects such as toasters, coffee machines, thermostat systems, washers, dryers, lamps, automobiles, and the like. IoT devices may also include, for example, a variety of devices in a "smart" building including lights, temperature sensors, humidity sensors, occupancy sensors, and the like. The IoT services for the IoT devices can be used for device automation, data capture, providing alerts, personalization of settings, and numerous other applications.

The term "IoT support service" refers to a device, a portion of at least one device, or multiple devices such as a distributed system, to which, in some examples, IoT devices connect on the network for IoT services. In some examples, the IoT support service is an IoT hub. In some examples, the IoT hub is excluded, and IoT devices communicate with an application back-end, directly or through one or more intermediaries, without including an IoT hub, and a software component in the application back-end operates as the IoT support service. IoT devices receive IoT services via communication with the IoT support service. In some examples, an IoT support service may be embedded inside of a device, or in local infrastructure.

Application back-end 313 refers to a device, or multiple devices such as a distributed system, that performs actions that enable data collection, storage, and/or actions to be taken based on the IoT data, including user access and control, data analysis, data display, control of data storage, automatic actions taken based on the IoT data, and/or the like. Application back-end 313 could also be one or more virtual machines deployed in a public or a private cloud. In some examples, at least some of the actions taken by the application back-end may be performed by applications running in application back-end 313.

Each of the IoT devices 341 and 342 and/or the devices that comprise IoT support service 351 and/or application back-end 313 may include examples of computing device 200 of FIG. 2. The term "IoT support service" is not limited to one particular type of IoT service, but refers to the device to which the IoT device communicates, after provisioning, for at least one IoT solution or IoT service. That is, the term "IoT support service," as used throughout the specification and the claims, is generic to any IoT solution. The term IoT support service simply refers to the portion of the IoT solution/IoT service to which provisioned IoT devices communicate. In some examples, communication between IoT devices and one or more application back-ends occur with an IoT support service as an intermediary. FIG. 3 and the corresponding description of FIG. 3 in the specification illustrates an example system for illustrative purposes that does not limit the scope of the disclosure.

One or more of the IoT devices 341 and 342 may include device controller 345, which may operate to control the IoT device. Each device controller 345 may include multiple execution environments. Device controller 345 may be a multi-core microcontroller. In some examples, device controller 345 is an integrated circuit with multiple cores, such as at least one central processing unit (CPU) and at least one microcontroller (MCU).

Network 330 may include one or more computer networks, including wired and/or wireless networks, where each network maybe, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 330 may include various other networks such as one or more networks using local network protocols such as 6LoWPAN, ZigBee, or the like. Some IoT devices may be connected to a user device via a different network in network 330 than other IoT devices. In essence, network 330 includes any communication method by which information may travel between IoT support service 351, IoT devices 341 and 342, and application back-end 313. Although each device or service is shown connected as connected to network 330, that does not mean that each device communicates with each other device shown. In some examples, some devices/services shown only communicate with some other devices/services shown via one or more intermediary devices. Also, although network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

As one example, IoT devices 341 and 342 are devices that are intended to make use of IoT services provided by IoT support service 351.

System 300 may include more or less devices than illustrated in FIG. 3, which is shown by way of example only.

Illustrative Device

Figure 4:
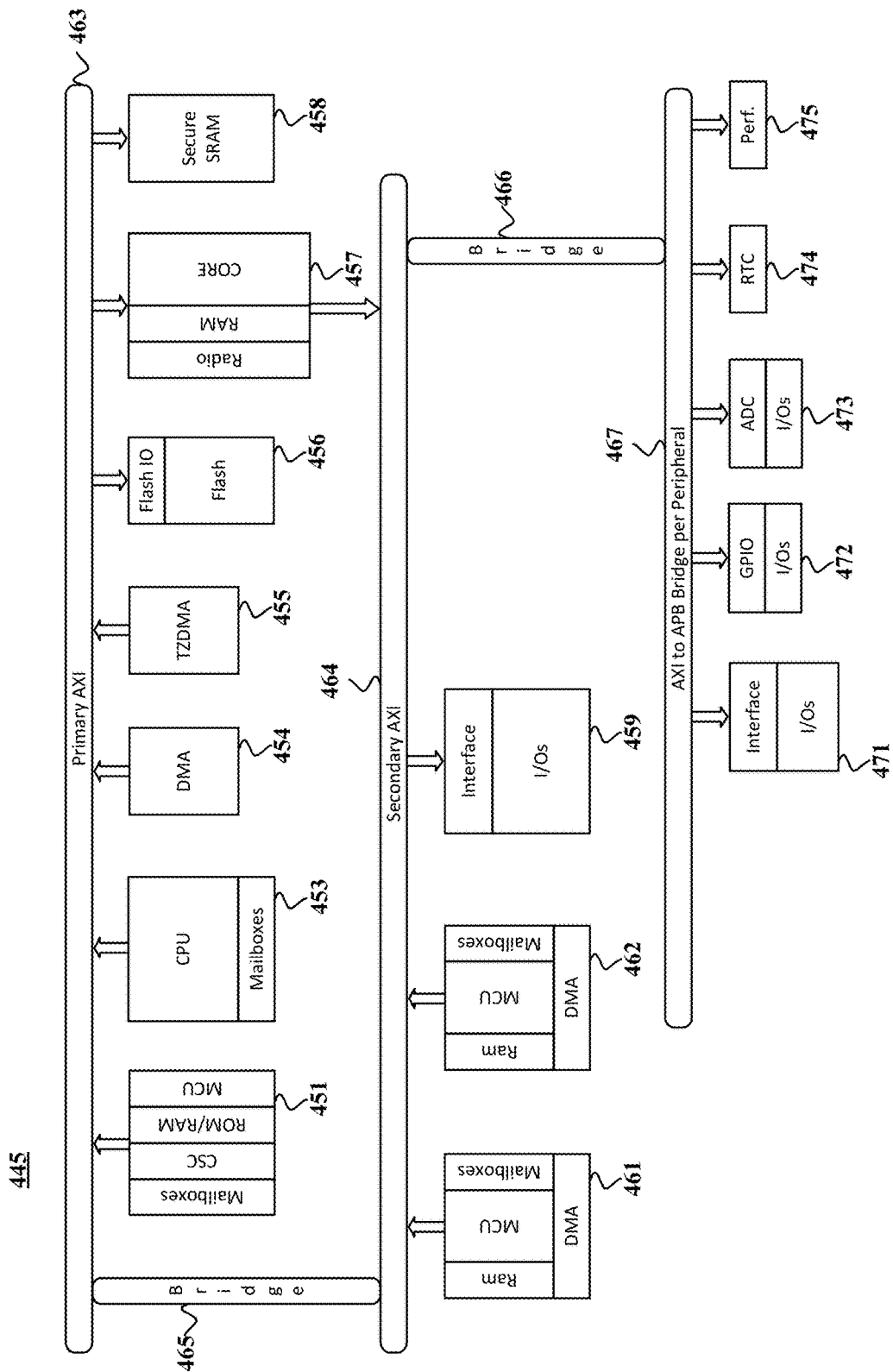
FIG. 4 is a block diagram illustrating an example of the device controller of FIG. 3.

FIG. 4 is a block diagram illustrating an example of device controller 445. Device controller 445 may be employed as an example of device controller 345 of FIG. 3. Device controller 445 may include security complex 451, CPU 453, direct memory access (DMA) block 454, trust zone (TZ) DMA block 455, Flash memory 456, Radio block 457, secure static random access memory (SRAM) 458, Interfaces 459, MCU 461, MCU 462, primary advanced extensible interface (AXI) bus 463, secondary AXI bus 464, bridges 465 and 466, AXI to advanced peripheral bus (APB) bridges per peripheral 467, Interfaces 471, GPIOs 472, analog-to-digital converter (ADC) 473, real-time clock (RTC) 474, and performance counter 475.

In some examples, device controller 445 enables a device in which device controller 445 is included to operate as an IoT device, such as IoT device 341 or 342 of FIG. 3. In some examples, device controller 445 is a multi-core microcontroller. In some examples, device controller 445 runs a high-level operating system. In some examples, device controller 445 may have at least 4 MB of RAM and at least 4 MB of flash memory, and may be a single integrated circuit. In some examples, device controller 445 provides not just network connectivity, but various other functions including hardware and software security, a monitored operating system, cryptographic functions, peripheral control, telemetry, and/or the like. In addition, device controller 445 may include technology for allowing device controller 445 to be booted in a secure manner, allowing device controller 445 to be securely updated, ensuring that proper software is running on device controller 445, allowing device controller 445 to function correctly as an IoT device, and/or the like.

In some examples, security complex 451 include a core security complex (CSC) that is the hardware root of trust in device controller 445. In some examples, the core security complex is directly connected to the secure MCU in security complex 451. In some examples, the secure MCU in security complex 451 has a very high degree of trust, but is less trusted than the core security complex in security complex 451. In some examples, security complex 451 brings up the full system at boot.

In some examples, CPU 453 runs a high-level operating system. In some examples, CPU 453 has two independent execution environments: a Secure World execution environment and a Normal World execution environment. The term "secure world" is used broadly to refer to a trusted environment and is not limited to a particular security feature. In some examples, the Secure World execution environment of CPU 453 is also part of the trusted computing base of the system. For instance, in some examples, the Secure World execution environment of CPU 453 has unfettered access to reprogram hardware protection mechanisms, such as firewalls in some examples. In some examples, the Secure World execution environment of CPU 453 does not, however, have access to the internals of the core security complex of security complex 451 and relies on the secure MCU of security complex 451 for particular security-sensitive operations.

Radio block 457 may provide Wi-Fi communication. Primary AXI bus 463 and secondary AXI bus 464 may be buses that connect the components shown. In some examples, bridges 465, 466, and 467 bridge the components shown. RTC block 474 may operate as a real-time clock. In some examples, all components in device controller 345 can read from the RTC block 474, but not all components have write access to RTC block 474. Device controller 445 may include various forms of memory, including flash and SRAM, such as flash memory 456 and secure SRAM 458.

In some examples, IO Subsystem 1 461 and IO Subsystem 2 462 are I/O subsystems for general purpose I/O connectivity. In some examples, IO Subsystem 1 461 and IO Subsystem 2 462 each include an MCU.

DMA block 454 may be used to manage data movement for the Normal World execution environment of CPU 453. Trust zone (TZ) DMA block 455 may be used to manage data movement for the Secure World execution environment of CPU 453. In some examples, each IO subsystem also has its own DMA block. Each of the DMA blocks may be configured to support data movement between cores, peripherals, other components, and/or the like.

Each of the cores may have bi-directional mailboxes to support inter-processor communication. Performance counter 475 may be configured to count read requests, write requests, and data type requests for performance monitoring. In some examples, performance counter 475 may also be configured to measure latency from a core to a target, such as from MCU 462 to SRAM 458.

In some examples, the interfaces at block 459 include two Inter-integrated circuit Sound (I2S) interfaces: one for audio input and one for audio output. In other examples, other configurations of interfaces may be employed, and block 459 may include any suitable interfaces in various examples.

In some examples, the MCU in security complex 451 has a very high degree of trust, but is less trusted than the core security complex in security complex 451. In these examples, the MCU in security complex 451 controls one or more functions associated with a very high degree of trust. In one example, the MCU in security complex 451 controls power for device controller 445 and/or an IoT device.

In some examples, the Secure World execution environment of CPU 453 is also part of the trusted computing base of the system. For instance, in some examples, the Secure World runtime of CPU 453 (Secure World RT) has unfettered access to reprogram hardware protection mechanisms, such as firewalls in some examples. In some examples, Secure World RT does not, however, have access to the internals of the core security complex of security complex 451 and relies on the MCU in security complex 451 for particular security-sensitive operations.

The Normal World execution environment of CPU 453 may be configured to have limited access to such on-chip resources such as memories. In some examples, various security and quality standards (e.g., relatively high standards) may be enforced for code running in this environment but is less trusted than either the code running on the MCU in security complex 451 or the code running in the Secure World of CPU 453.

In some examples, MCUs 461 and 462 are less trusted than the MCU in security complex 451 and less trusted than CPU 453. In some examples, Radio block 457 may include a core, which may be an MCU in some examples. Radio block 457 may provide Wi-Fi functionality and connectivity to the Internet and cloud services such as IoT services. In some examples, Radio block 457 may provide communications via Bluetooth, Near Field Communication (NFC), ZigBee, Long-Term Evolution (LTE), and/or other connectivity technology. In some examples, the core in Radio block 457 does not have any access to unencrypted secrets, and is not capable of compromising the execution of CPU 453.

In some examples, each independent execution environment is managed by a single software component executing in a separate execution environment that is referred to the "parent" of the execution environment. In such examples, one exception may be that the hardware root of trust (the core security complex of security complex 451 in this example) has no parent. In one particular example, each parent executes in an environment that is at least as trusted as the environments it manages. In other examples, other suitable means of security may be employed. Management operations may include booting and resuming the target environment, monitoring and handling resets in the target environment, and configuring access policy for the target environment. In some cases, certain management operations are performed by a component other than a parent. For instance, in some examples, the Normal World of CPU 453 is the environment that manages MCUs 461 and 462, but receives assistance from the Secure World of CPU 453 to do so.

For instance, in some examples, the MCU of security complex 451 manages Secure World RT of CPU 453, a component in Secure World RT in CPU 453 manages Normal World OS of CPU 453, a component in the Normal World OS of CPU 453 manages Normal World user-mode of CPU 453, and Normal World user-mode services of CPU 453 manages the MCUs 461 and 462 and the core in Radio block 457.

In some examples, not only are independent execution environments managed by a software component from a more trusted execution environment, but different functions are assigned to the different independent execution environments, with more sensitive functions assigned to more trusted independent execution environments. In one particular example, independent execution environments less trusted than the independent execution environment to which it is assigned are restricted from having access to the function. In this way, in some examples, the independent execution environments achieve defense-in-depth based on a hierarchy of trust.

For instance, in some examples, the core security complex of security complex 451 is at the top of the hierarchy and is assigned to secrets (e.g., encryption keys), the secure MCU in core security complex 451 is next in the hierarchy and is assigned to controlling power, Secure World RT of CPU 453 is next in the hierarchy and is assigned to storage and to write access to a real time clock (RTC), Normal World OS of CPU 453 is next in the hierarchy and is assigned to Wi-Fi, Normal World user-mode applications of CPU 453 is next in the hierarchy and is assigned to applications, and the MCUs 461 and 462 are at the bottom of the hierarchy and are assigned to peripherals. In other examples, functions are assigned to independent execution environments in a different manner.

In some examples, each level of the hierarchy of trust, except for the bottom (i.e., least trusted) level of the hierarchy, has control over accepting or rejecting requests from a less trusted level, e.g., in terms of implementing support for the software they handle, and have the ability to rate limit or audit the requests from less trusted levels, and to validate requests from lower levels, e.g., to ensure that the requests correct and true. Also, as previously discussed, in some examples, each level of hierarchy except the top (i.e., most trusted) level has a parent that is responsible for managing the lower (i.e., less trusted) level, including monitoring whether the software on the lower level is running correctly.

Figure 5:
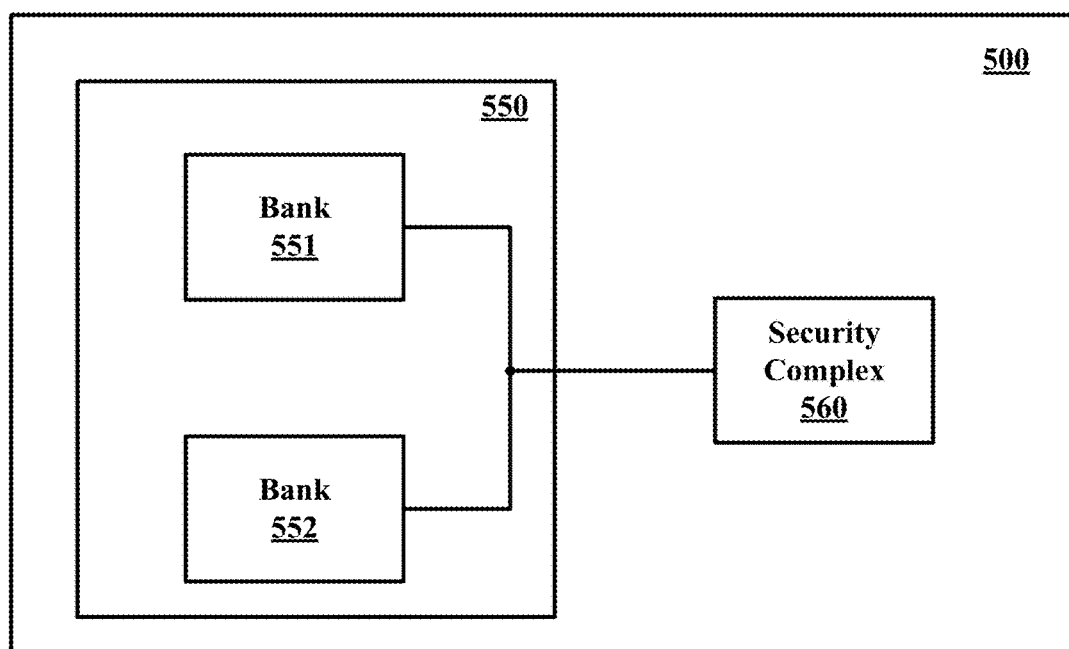
FIG. 5 is a block diagram illustrating an example of a device for data security.

FIG. 5 is a block diagram illustrating an example of device 500. Device 500 may be employed as an example of device controller 345 of FIG. 3 and/or device controller 445 of FIG. 4. Device 500 may include memory 550 and security complex 560. Memory 550 may include a plurality of memory banks including first memory bank 551 and second memory bank 552.

Some examples of device 500 may be a multi-core microprocessor that includes, for example, at least one CPU and at least one microcontroller, in addition to flash memory with multiple banks as previously discussed. In some examples, the multi-core processor may be an integrated circuit with multiple cores. In some examples, the multi-core processor may be used to provide functionality for a connected device. In some examples, device 500 may provide network connectivity to the connected device, and may also provide various other functions such as hardware and software security, a monitored operating system, cryptographic functions, peripheral control, telemetry, and/or the like. In addition, device 500 may include technology for allowing device 500 to be booted in a secure manner, allowing the device to be securely updated, ensuring that "proper" software is running on the device, allowing the device to function correctly as an IoT device, and/or the like. Security complex 560 may include the hardware root of trust of device 500 as the basis for the security functions provided by device 500.

However, the disclosure is not some limited, and examples of device 500 other than a multi-core processor may also be employed as examples of device 500, for instance, in various examples in which it is useful to protect a secure portion of a flash memory or other type or memory.

In some examples, memory 550 stores data, and at least a portion of the data is interleaved amongst at least two of the plurality of memory banks. In some examples, security complex 560 is configured to prevent access to at least one of the plurality of memory banks while a debug mode or recovery mode is occurring in device 500, and to prevent access to the at least one of the plurality of memory banks starting with initial boot until a verification by security complex 560 is successful. The verification by the security complex may include security complex 560 verifying a signature.

In essence, in some examples, access to at least one of the plurality of memory banks is prevented at each power on, is prevented entirely when device 500 is booted in any mode in which the signature is not checked, and if device 500 is booted in a mode in which the signature is checked, then from power on until the signature is verified, access to at least one of the plurality of memory banks is prevented. The modes in which the signature is not checked may include, for example, a debug mode and a recovery mode.

In some examples, access to the same memory bank is prevented each time, so that it is not possible to learn secrets by booting multiple times.

In some examples, memory 550 is a flash memory. In some examples, memory 550 is an external NOR flash memory that includes a flash controller and dual quad serial public interface (QSPI) NOR flash devices (the two memory banks, in this example) in parallel, where each flash memory bank is a separate integrated circuit accessed via a separate channel. However, the disclosure is not so limited, and any suitable memory configuration and/or suitable set of memories may be employed.

In some examples, device 500 has a recovery mode that may be used to re-flash memory 550. In some examples, device 500 can be booted in a recovery mode in which it is possible to load an unsigned external image. In some examples, the second QPSI is disabled when device 500 boots in a recovery mode.

In some examples, device 500 has a debug mode in which device 500 can be booted when a debug pin is asserted HIGH. In debug mode, it is possible to attach an external hardware debugger and for device 500 to accept the attached external hardware debugger. With such an attached external debugger, it is possible to change the CPU instruction from the first instruction ROM in device 500, and there is no guarantee that the ROM code executes at all in device 500, or that the ROM code executes in device 500 as intended. In some examples, the second QPSI is disabled when device 500 boots in a debug mode. In some examples, the disabling of the second QPSI when device 500 boots in a debug mode is hardware-enforced, e.g., access to the second QPSI is disabled, blocked, or otherwise hardware prevented by a configuration of hardware elements or other hardware features. Because disabling of the second QPSI when device 500 boots in debug mode is hardware enforced in some examples, in these examples, malicious software cannot over-write the access prevention to allow access and learn secrets stored in the secure portion of the flash memory. In some examples, access to the second QPSI being hardware prevented means that code executed from the debugger attached in debug mode cannot alter the disabling of the second QSPI.

In some examples, on initial boot, access is prevented to at least one of the plurality of memory banks. For instance, in some examples, on initial boot, the second QPSI channel is disabled. In some examples, device 500 operates from ROM code at initial boot. In some examples, during debug mode, recovery mode, test mode, or the like, access to the restricted bank is not allowed at any time. In some examples, during normal boot, access to the restricted bank is not allowed at initial boot, but is allowed subsequently upon verification that includes verification of a signature, such as the verification of the digital signature of a first bootloader. Verification of the signature before enabling access may ensure that secure data that is in a secure portion of memory 550 can only be accessed by trusted code.

During a normal boot, the processor may be booted in a secure manner that begins with a security complex that includes a hardware root of trust for device 500. In some examples, a first bootloader is read from ROM, and a public key may be used by security complex 560 to verify that the first bootloader has been properly digitally signed. In some examples, verifying the signature of the first bootloader is a cryptographic operation that is performed in hardware. In some examples, until and unless the digital signature of the first bootloader is verified, the first bootloader is not loaded, and access to all of the flash memory banks is prevented. In some examples, once the signature of the first bootloader is verified, the first bootloader is loaded, and access to all of the flash memory banks is allowed. In some examples, further verification beyond just verification of the first bootloader has been signed may also be required in order to grant access to all of the flash memory banks. This may be used to help protect against, for example, loading of valid older code with vulnerabilities.

Preventing access to the secure data in the secure portion of memory 550 during debug or recovery mode may prevent a class of attacks known as rollback attacks. For example, a rollback attack may load an earlier version of software, such as an earlier version of an OS, in order to take advantage of security vulnerabilities in the earlier version of the software.

In some examples, device 500 allows a recovery mode to be used for recovery, but does not allow recovery of all of the memory banks. In some examples, in this way, the firmware portion can be re-written, but not all of the flash memory. A different recovery method may be used to recover the rest of memory 550. In some examples, hardware is used to prevent access to the restricted memory bank, so that it is not possible for software to overwrite the access protection in such as a way as to allow access.

In some examples, verification in order to allow access to allow the memory banks may proceeds as follows. Security complex 560 may read in a portion of one of the memory banks that is not restricted, such as the first memory bank in some examples. In some examples, this portion of the flash memory may be 16 kb, 52 kb, or the like. A hardware block in security complex 560 may then compare the loaded portion of the non-restricted flash memory bank against particular hardware fuses, with verification being unsuccessful unless the loaded portion matches the fuses. Hardware keys may also be used to verify that the code is trusted code in some examples. Comparison of a portion of the non-restricted portion of the flash memory against hardware fuses by a hardware block in security complex 560 may be used to prevent previously valid but now older code from having vulnerabilities being loaded. Fuses may be burned, along with changing the corresponding non-restricted portion of flash memory to be checked against the hardware fuses to be matched with the fuses being updated, to prevent such older code from subsequently being validated and from having access to the secrets stored in the secure portion of the flash memory.

Device 500 may further operate such that, even during a "normal" boot, after access to all of the memory banks of the flash memory have been enabled, only secure code has access to the portion of the flash memory that includes the secure portion of the flash memory that may include secrets. For instance, in some examples, after access to all of the memory banks of the flash memory have been enabled, a firewall protecting the flash memory allows only secure code to have access to certain portions of the flash memory, including the portions that include the secrets.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

Figure 6:
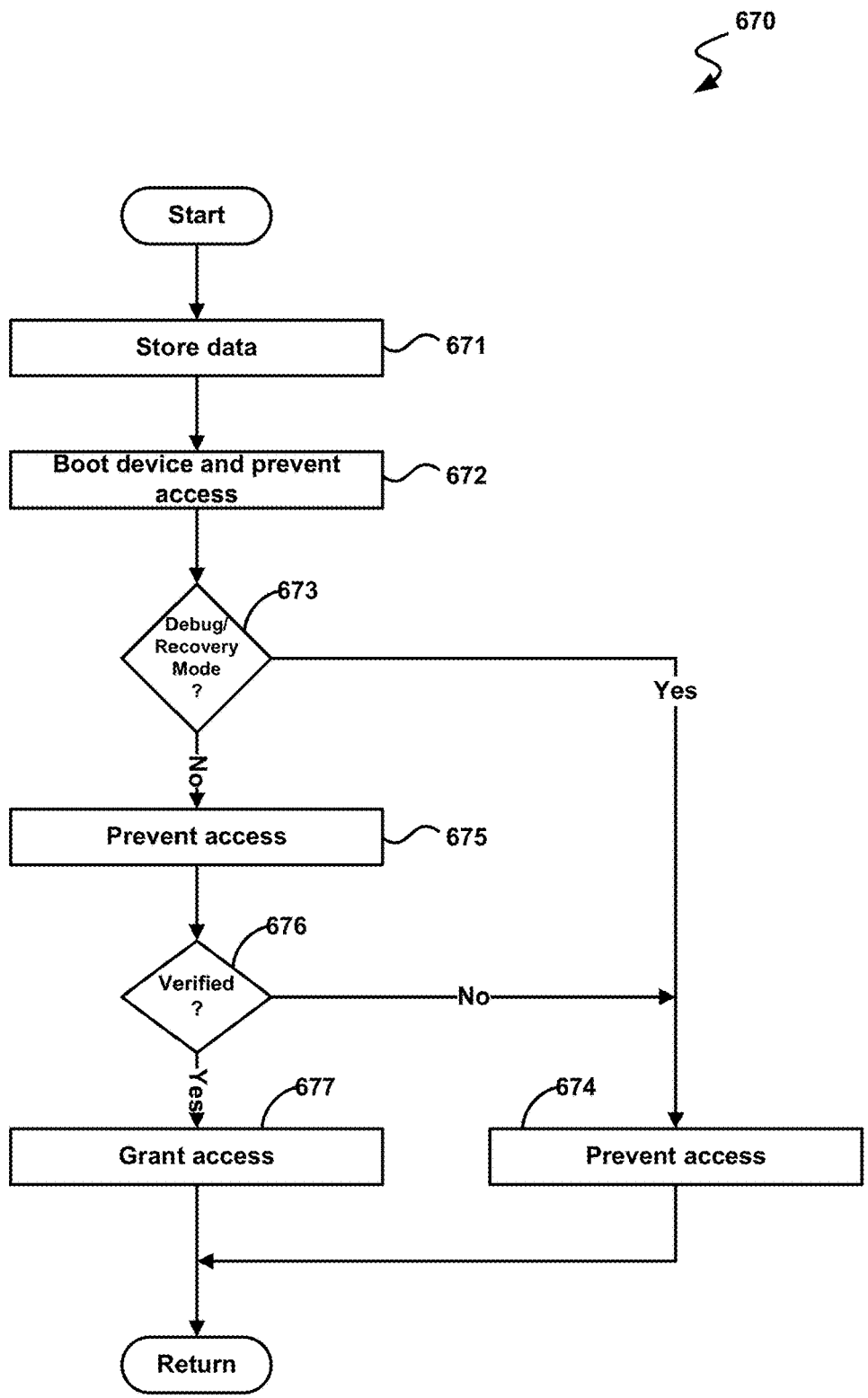
FIG. 6 is a diagram illustrating an example dataflow for a process for data security, in accordance with aspects of the present disclosure.

FIG. 6 is a diagram illustrating an example dataflow for a process (670).

In the illustrated example, step 671 occurs first. At step 671, in some examples, data is stored in a memory. The memory may include a plurality of memory banks including a first memory bank and a second memory bank. At least a portion of the data may be interleaved amongst at least two of the plurality of memory banks.

As shown, step 672 occurs next in some examples. At step 672, in some examples, a device is booted, and access is prevented to at least one of the plurality of memory banks.

As shown, decision step 673 occurs next in some examples. At decision block 673, a determination is made as to whether the device booted in a debug mode, recovery, mode, or the like. If so, the process moves to step 674. At step 674, in some examples, access continues to be prevented to at least one of the plurality of memory banks. The process may then advance to a return block, where other processing is resumed.

If instead at decision step 673 the determination is negative, and the device did not boot in a debug mode, recovery mode, or the like, the process moves to step 675.

At step 675, access is prevented to the at least one of the plurality of memory banks. As shown, decision block 676 occurs next in some examples. At decision block 676, a determination is made as to whether or not verification by a security complex is successful. The verification by the security complex may include the security complex verifying a signature. If the verification is not successful, the process moves to block 674. If instead the verification is successful, the process proceeds to step 677. At step 677, in some examples, access to the plurality of memory banks is granted.

The process may then proceed to the return block, where other processing is resumed.

Conclusion

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. A device for data security, comprising:
a memory including a plurality of memory banks including a first memory bank and a second memory bank, wherein at least a portion of data is interleaved amongst at least two of the plurality of memory banks; and
a security complex that is configured to prevent access to at least one of the plurality of memory banks while a debug mode or recovery mode is occurring, and to prevent access to the at least one of the plurality of memory banks starting with initial boot until a verification by the security complex is successful, wherein the verification by the security complex includes the security complex verifying a signature.

2. The apparatus of claim 1, wherein preventing access to the at least one of the plurality of memory banks while a debug mode or recovery mode is occurring is accomplished via hardware prevention.

3. The apparatus of claim 1, wherein each memory bank of the plurality of memory banks is a flash memory bank.

4. The apparatus of claim 1, wherein the portion of data is a secure portion of the memory that is interleaved by two between the first memory bank and the second memory bank, and wherein access being preventing to at least one of the memory banks includes preventing access to the second memory bank.

5. The apparatus of claim 1, wherein the security complex includes a hardware root of trust for the device.

6. The apparatus of claim 1, wherein the signature is a digital signature of a first bootloader.

7. The apparatus of claim 6, wherein the security complex includes a read-only memory, and wherein the first bootloader is read from the read-only memory.

8. The apparatus of claim 6, wherein the security complex verifies the digital signature with a public key that is stored in the security complex.

9. A method for data security, comprising:
storing data in a memory, the memory including a plurality of memory banks including a first memory bank and a second memory bank, wherein at least a portion of the data is interleaved between at least two of the plurality of memory banks; and
causing access to be prevented at least one of the plurality of memory banks while operating in a mode that does not include signature validation is occurring, and causing access to be prevented access to the at least one of the plurality of memory banks starting with an initial boot until a verification by a security complex is successful, wherein the verification by the security complex includes the security complex verifying a signature.

10. The method of claim 9, wherein a debug mode and a recovery mode are each a mode that does not include signature validation.

11. The method of claim 9, wherein causing access to be prevented to the at least one of the plurality of memory banks while a debug mode or recovery mode is occurring is accomplished via hardware prevention.

12. The method of claim 9, wherein each memory banks of the plurality of memory banks is a flash memory bank.

13. The method of claim 9, wherein the signature is a digital signature of a first bootloader.

14. The method of claim 13, wherein the security complex includes a read-only memory, and wherein the first bootloader is read from the read-only memory.

15. The method of claim 13, wherein the security complex verifies the digital signature with a public key that is stored in the security complex.

16. An apparatus for data security, comprising:
a device, including:
a flash memory including a plurality of flash memory banks including a first flash memory bank and a second flash memory bank, wherein at least a portion of data is interleaved amongst at least two of the plurality of flash memory banks; and
a security complex that is configured to prevent access to at least one of the plurality of flash memory banks while a debug mode or recovery mode is occurring, and to prevent access to the at least one of the plurality of flash memory banks starting with initial boot until a verification by the security complex is successful, wherein the verification by the security complex includes the security complex verifying a signature.

17. The apparatus of claim 16, wherein preventing access to the at least one of the plurality of flash memory banks while a debug mode or recovery mode is occurring is accomplished via hardware prevention.

18. The apparatus of claim 16, wherein the signature is a digital signature of a first bootloader.

19. The apparatus of claim 18, wherein the security complex includes a read-only memory, and wherein the first bootloader is read from the read-only memory.

20. The apparatus of claim 18, wherein the security complex verifies the digital signature with a public key that is stored in the security complex.

* * * * *